United States Patent
Carnahan (10) Patent No.: US 6,613,285 B1
(45) Date of Patent: Sep. 2, 2003

(54) REACTOR PLATE AND METHOD

(75) Inventor: James Claude Carnahan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 216 days.

(21) Appl. No.: 09/668,981

(22) Filed: Sep. 25, 2000

(51) Int. Cl.$^7$ .............................. B01L 3/00; B01L 9/00; H05B 3/02; H05B 3/44; H05B 3/10
(52) U.S. Cl. .................... 422/102; 422/99; 422/104; 436/147; 436/174; 219/538; 219/544; 219/548; 219/552; 219/553
(58) Field of Search ................... 422/102, 99, 104; 436/518, 526; 219/730, 538, 543, 663, 544, 548, 552, 553

(56) References Cited

U.S. PATENT DOCUMENTS

| | | | |
|---|---|---|---|
| 4,266,108 A | * | 5/1981 | Andersen et al. ........... 219/730 |
| 4,566,804 A | | 1/1986 | Collins et al. |
| 4,769,519 A | * | 9/1988 | Hall |
| 4,849,611 A | * | 7/1989 | Whitney et al. ............ 219/538 |
| 5,068,517 A | * | 11/1991 | Tsuyuki et al. ............. 219/543 |
| 5,126,521 A | | 6/1992 | McGaffigan |
| 5,143,854 A | | 9/1992 | Pirrung et al. |
| 5,182,427 A | * | 1/1993 | McGaffigan ................ 219/663 |
| 5,880,972 A | | 3/1999 | Horlbeck |
| 5,911,898 A | | 6/1999 | Jacobs et al. |
| 5,980,704 A | | 11/1999 | Cherukuri et al. |
| 6,077,454 A | | 6/2000 | Tenzer |
| 6,121,055 A | * | 9/2000 | Hargreaves ................. 436/526 |
| 6,149,869 A | * | 11/2000 | Antonenko et al. ........... 422/99 |
| 6,171,555 B1 | * | 1/2001 | Cargill et al. ............... 422/104 |
| 6,355,491 B1 | * | 3/2002 | Zhou et al. ................. 436/518 |

FOREIGN PATENT DOCUMENTS

| | | |
|---|---|---|
| WO | 0009255 | 11/1995 |
| WO | 0054882 | 9/2000 |

OTHER PUBLICATIONS

T. R. Connolly and E. D. Copenhaver, Bibliography of Magnetic Materials and Tabulation of Magnetic Transition Temperatures, Solid State Physics Literature Guides, 1972, vol. 5, pp. 1–29 and 61–64.

* cited by examiner

Primary Examiner—Jill Warden
Assistant Examiner—Brian J. Sines
(74) Attorney, Agent, or Firm—Dougherty, Clements & Hofer; Tracey R. Loughlin

(57) ABSTRACT

A CHTS reactor plate has wells that can be individually heated. The reactor plate includes a substrate with an array of reaction wells and a ferromagnetic material included with the substrate. A CHTS method provides a reactor plate having a substrate with an array of reaction wells and a ferromagnetic material responsive to the application of an electric field included with the substrate. The electric field is energized to control temperature in the proximity of at least one of the reaction wells. Another method comprises providing a reactor plate comprising an array of reaction wells and depositing a ferromagnetic object within at least one of the wells. The object is responsive to the application of an electric field. An electric field is then energized to control temperature in the reaction well.

42 Claims, 6 Drawing Sheets

REACTOR PLATE AND METHOD

BACKGROUND OF THE INVENTION

The present invention relates to a reactor plate and method for running multiple parallel screening reactions using multiphase reactant systems.

In experimental reaction systems, each potential combination of reactant, catalyst and condition must be evaluated in a manner that provides correlation to performance in a production scale reactor. Since about 1970, combinatorial organic synthesis (COS) has provided an important tool to address the requirements of experimental systems. COS is a systematic and repetitive synthesis that uses sets of chemical "building blocks" to form a diverse set of molecular entities. As with traditional research, COS relies on organic synthesis methodology. However instead of synthesizing a single compound, COS exploits automation and miniaturization to synthesize large libraries of compounds; a procedure that can involve successive stages, each of which produces a chemical modification of an existing molecule of a preceding stage. The synthesis produces large numbers of diverse compounds, which can be screened for various activities.

In one approach to COS, arrayed, spatially addressable building blocks are reacted systematically on particle supports. The particles are distributed into a two-dimensional array so that each variant in a combinatorial library can be identified by its position in the array. The array can consist of a set of plates, each having rows and columns of wells, with one particle, or some other predetermined number of particles contained in each well. The particles are typically made of polystyrene. They serve as substrates for different compounds produced in the process of split and combine synthesis. Ultimately, synthesized compounds are stripped from the particles and tested for activity. The identity of an active compound can be determined by spectrographic analysis in the light of the information available concerning the reaction histories of the particles.

Combinatorial high throughput screening (CHTS) applies combinatorial chemistry principles of COS to the high throughput screening of materials and processes, particularly industrial materials and processes. A CHTS method can be characterized by parallel reactions at a micro scale. In one aspect, CHTS can be described as a method comprising (A) an iteration of steps of (i) selecting a set of reactants, conditions, catalysts or combinations thereof; (ii) reacting the set and (iii) evaluating a set of products of the reacting step. The CHTS method can further comprise (B) repeating the iteration of steps (i), (ii) and (iii) wherein a successive set of reactants, conditions, catalysts or combinations thereof, selected for a step (i) is chosen as a result of an evaluating step (iii) of a preceding iteration.

CHTS reactions are often conducted at elevated temperatures and at pressures both above and below atmospheric. Precise control of temperature can be critical for accurate evaluation of results. Precise control of temperature in each respective well may be part of a screening protocol. In this case, separate temperature control of each well may be required. In some CHTS systems, it may be necessary to repeatedly test within a precise and narrow range of temperatures. In this instance, the temperature ranges must be accurately duplicated in each well of an array as well as in repeated iterations of the CHTS protocol.

A uniformly heated array of wells may be obtained by placing a plate in a heated bath, oven or autoclave. But this mechanism does not address the problem of reactions that require different temperatures from well to well and can only poorly match temperatures from iteration to iteration. The wells can be individually wired and controlled with thermocouples or electromechanical or electronic controllers to provide different temperatures in different wells but these solutions are prohibitively expensive. There is a need for a reactor plate and method to provide separate effective and inexpensive heat control of respective plate wells for CHTS.

BRIEF SUMMARY OF THE INVENTION

The present invention provides a reactor plate with wells that can be individually heated or that can be precisely repeatedly heated and a method that can provide individual and reproducible heat control of wells. According to the invention, a reactor plate comprises a substrate with an array of reaction wells and a ferromagnetic material included with the substrate.

In another embodiment, a CHTS method comprises providing a reactor plate comprising a substrate with an array of reaction wells and a ferromagnetic material responsive to the application of an electric field. The electric field is energized to control temperature in the proximity of at least one of the reaction wells.

In a final embodiment, a CHTS method comprises providing a reactor plate comprising an array of reaction wells and depositing a ferromagnetic object within at least one of the wells. The object is responsive to the application of an electric field. An electric field is then energized to control temperature in the reaction well.

DETAILED DESCRIPTION OF THE INVENTION

Combinatorial synthesis may require that samples be heated to a reproducible high and constant temperature. The present invention is based on Curie point heating of ferromagnetic materials to provide accurate and reproducible temperature. Ferromagnetic materials display a hysteresis effect of polarization with an applied electrical field. A hysteresis loop is generated by the existence of permanent electric dipoles that spontaneously develop in the ferromagnetic material below the Curie temperature. A ferromagnetic material cation can be off center by a small fraction of an angstrom with respect to an anion to create an electric dipole. Energy barrier between possible cation positions is sufficiently low to permit motion of the cation between sites through coercion of an electric field. Hence, the material is easily polarized to a magnet. If the direction of the current is changed, the polarity of the magnet is reversed, i.e., N→S is reversed to S→N. When polarity of the coil is changed rapidly, heat is generated. The heat causes the ferromagnetic material to reach its Curie point temperature, where the magnetic property is lost and the temperature is maintained constant. The time to reach the Curie point temperature can be less than 0.2 second.

A radio frequency (RF) coil can provide one arrangement for applying an electric field to a ferromagnetic material to provide a heating system. In an RF heating system, a generator creates an alternating electric field between two electrodes or in the interior of a coil or between two plates. The electrodes are placed to oppose one another across a material to be heated. Alternating electric fields cause polar molecules in the material to continuously reorient themselves to face opposite poles much like the way bar magnets behave in an alternating electric field. The reorienting interaction causes the material to rapidly heat throughout its entire mass.

The application of the electric field can be through an antenna coil mounted in close proximity to the ferromagnetic material or surrounding the reaction plate. In the case of a flat antenna coil or a coil surrounding the reaction plate, the electrical properties of the antenna are adjusted to minimize the RF power reflected by the apparatus and coil. This is typically carried out by providing a matching element such as a variable capacitor in the RF power output to the antenna. Commercial RF power sources such as the RF200W from Plasma Sciences, Inc. 12 Columbus St., New Windsor, N.Y. 12553, contain the necessary electrical components to minimize reflected power and maximize energy transfer to the ferromagnetic material. An alternative method of excitation of the ferromagnetic material is by the application of microwave radiation. Commercial microwave ovens with controllable power levels such as the MDS-2100 Microwave Digestion System or the MARS-5 Microwave Accelerated Reaction System, both from CEM Corp. Mathews, N.C. 28106 are examples of suitable microwave sources.

The applied power, which in an RF system is the transmitter power minus the reflected power, is chosen to suit the desired rate of temperature rise. This in turn is dependent on the mass of the ferromagnetic material, the magnetic susceptibility of the ferromagnetic material, the heat capacity of the reactor plate and the reactants, heat losses due to convection, conduction and thermochemistry (such as heats of melting, vaporization, dissociation), a shape factor for the ferromagnetic articles and field strength at the ferromagnetic objects. The rate of temperature rise can be experimentally determined for a given system. Typically for ferromagnetic materials of several milligrams weight in an air atmosphere and well coupled to a 500 watt RF source the heating time to Curie temperature is on the order of less than 0.2 seconds. On reaching the Curie temperature, the amount of power may be maintained since the Curie point of the ferromagnetic object limits the temperature. Energy can be conserved, however, by lowering the applied power to just maintain the wells in the reactor plate at the desired temperature or temperatures.

RF generators can be used with output powers of many kilowatts, however antenna cooling, safety and shielding become problematic at higher power levels. An output power range can be 200 W to less than about 2000 W for an insulated single reactor array plate of approximately 3 inch by 5 inch dimension. Desirably, the range can be about 250 W to less than about 1000 W, which can be sufficient to reach temperatures of less than 1000° C.

The ferromagnetic material should have a Curie temperature in the desired temperature range, have high coercivity, should be castable or formable or able to be incorporated into composites, should be unreactive if in contact with a reaction medium or able to be coated or encapsulated. The materials can be prepared and formed using standard metallurgical methods. The Curie point of the particular form or shape of material can be confirmed before use in the CHTS method.

Different and accurate temperatures can be chosen by varying the composition of the ferromagnetic material. Several major families of ferromagnetic materials are commercially available. These include metals, alloys, ceramics and inorganic substances. T. R. Connolly and Emily D. Copenhaver, Bibliography of Magnetic Materials and Tabulation of Magnetic Transition Temperatures, Solid State Physics Literature Guides, 1972, 5, includes numerous suitable materials. The materials range from ferrite, which is low cost and low energy, to rare earth materials, which are high cost and high energy. The disclosure of the T. R. Connolly and Emily D. Copenhaver compilation is incorporated into this application by reference.

Pure metals such as nickel and iron with Curie temperatures of 358° C. and 770° C., respectively can be used as well as binary and higher multiplicity alloys. Examples of binary alloys are Gd/Co and Fe/Ni and an example of a ternary alloy is $GdYFe_2$ with a Curie temperature of 407° C. Ceramic materials such as $5Fe_2O_3 \cdot 3Y_2O_3$ with a Curie temperature of 290° C., are also useful.

Figure 1:
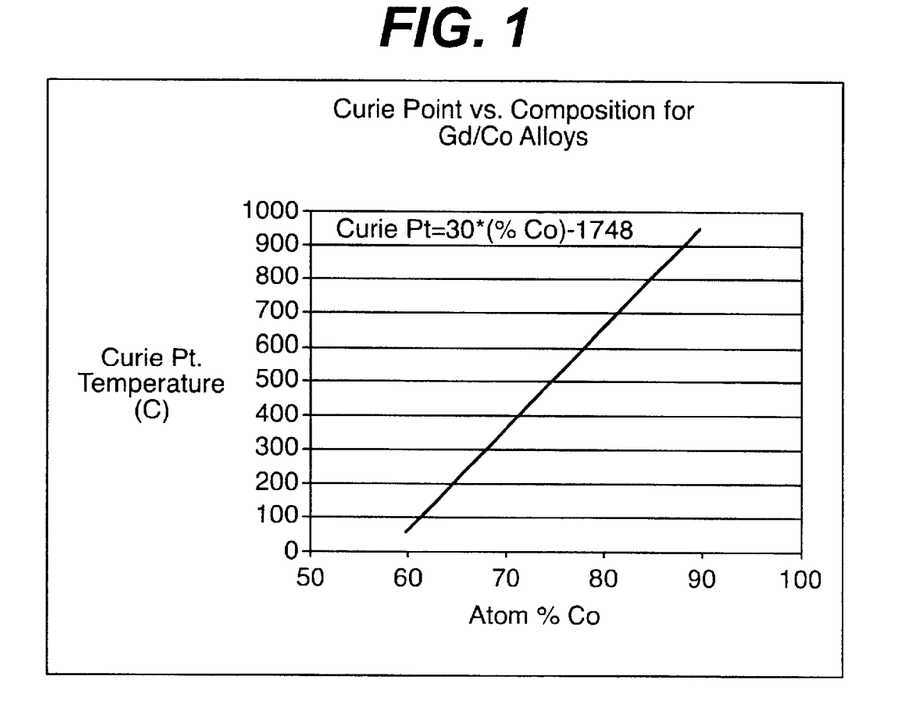
FIG. 1 is a plot of Curie temperature vs. composition.

There are a number of alloy series that have a range of Curie points in the temperature ranges applicable to organic and polymer chemistry. A particular alloy series with this property is the Gd/Co system. A plot of Curie temperature vs. composition for the Gd/Co system is shown in FIG. 1. The plot shows a straight line that is represented by:

Curie temperature (° C.)=Atom % Co×30−1748.

Thus, 68.3 atom % Cobalt in Gadolinium provides a Curie point of about 300° C.

Figure 2:
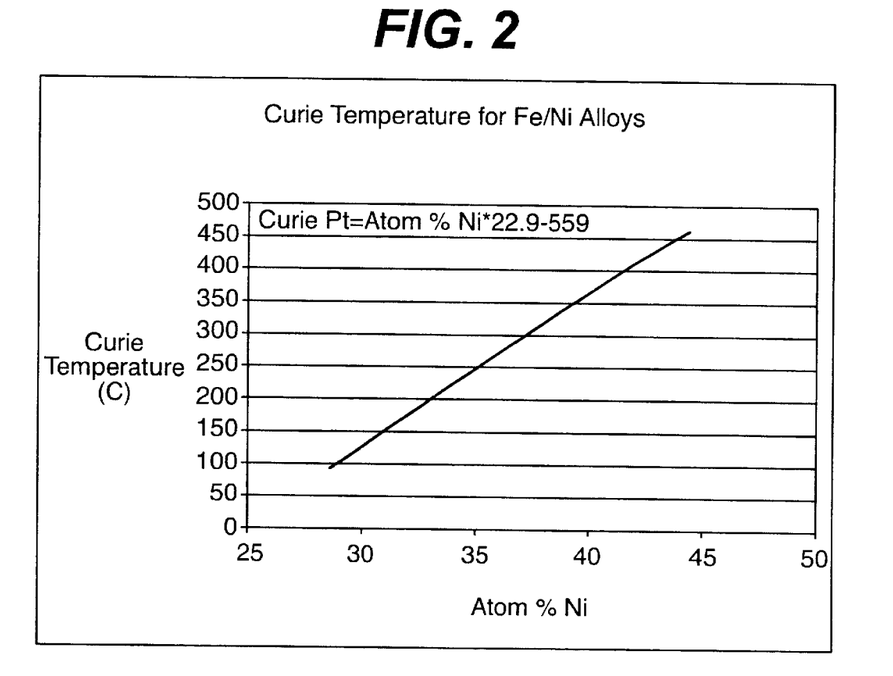
FIG. 2 is another plot of Curie temperature vs. composition.

The Curie temperature for Fe/Ni alloys ranges from less than 100° C. to over 450° C. A plot of known data is shown in FIG. 2. Here, the straight line is described by Curie Temperature (° C.)=Atom % Ni×22.9−559.

TABLE 1

| Material | Curie Pt. Temperature | Magnetic Energy | Cost | Resistance to Demagnetization |
|---|---|---|---|---|
| NdFeB | 150° C. | 48 MGOe | High | High |
| SmCo NeoForm-B | 300° C. | 32 MGOe | Very High | Very High |
| Bonded NdFeB | 150° C. | 10 MGOe | High | High |
| Alnicc | 550° C. | 7.5 MGOe | Moderate | Low |
| Ceramic Ferrite | 300° C. | 4 MGOe | Very Low | Moderate |

These and other features will become apparent from the drawings and following detailed discussion, which by way of example without limitation describe preferred embodiments of the present invention.

Figure 3:
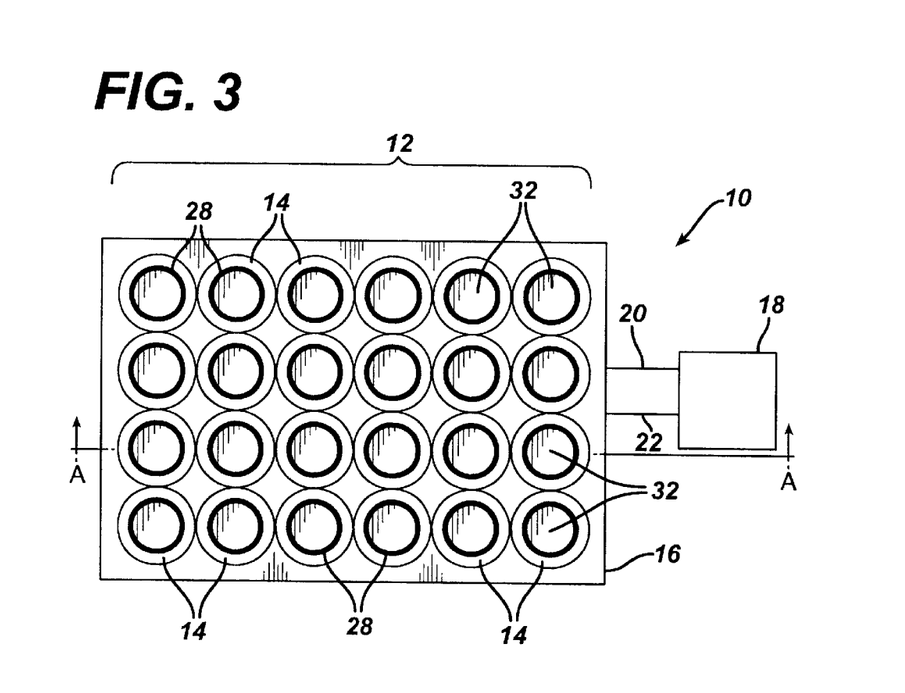
FIG. 3 is a schematic representation of a top view of a preferred reactor plate according to the invention.
Figure 4:
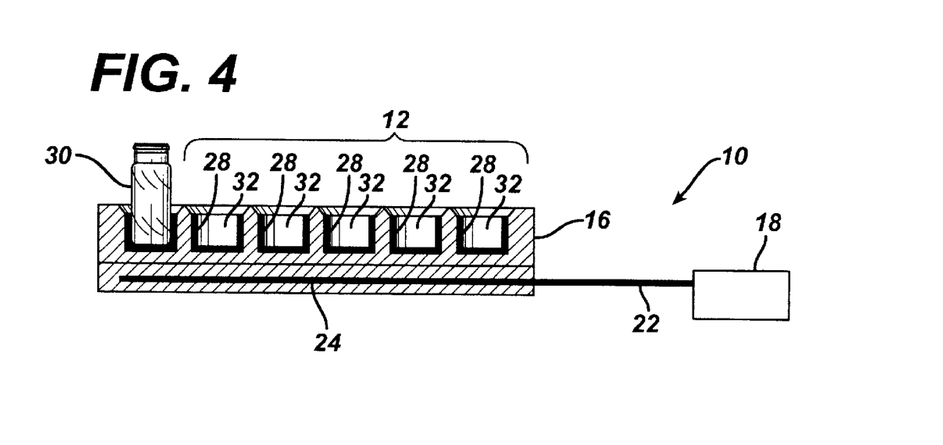
FIG. 4 is a schematic cut-away front view through line A—A of the reactor plate of FIG. 3.

FIG. 3 shows a top view of a preferred reactor plate and FIG. 4 shows a cut-away front view through line A—A of the plate of FIG. 3. FIG. 3 and FIG. 4 show reactor plate 10 that includes an array 12 of reaction wells 14 embedded into a supporting substrate 16 of the plate 10. The plate 10 further includes electric field generator 18. The walls and base of the wells 14 of the reactor plate 10 are constructed of the desired ferromagnetic material.

FIG. 3 shows that electric field generator 18 is Operatively connected via leads 20 and 22 to a flat RF antenna coil 24, which is embedded within supporting substrate 16. In the embodiment shown in FIG. 3 and FIG. 4, reaction wells 14 are lined with a ferromagnetic material 28. While the FIGS. show than all wells 24 are lined, in other embodiments, one or more wells can be lined and one of more wells can be lined with the same or with a different ferromagnetic material. The lined well can provide reaction wells for beads for COS, which can be used directly to carry out reactions. Or, the wells 14 can provide cavities 32 to accept reaction vials as exemplified by reaction vial 30 as shown in FIG. 4. The ferromagnetic material 28 can be an integral part of the supporting substrate 16 or the material 28 can form separate shaped inserts that can be replaceably fitted within the cavities 32 of the wells 14.

FIGS. 5 to 8 illustrate other embodiments of the reactor plate designated 40.

Figure 5:
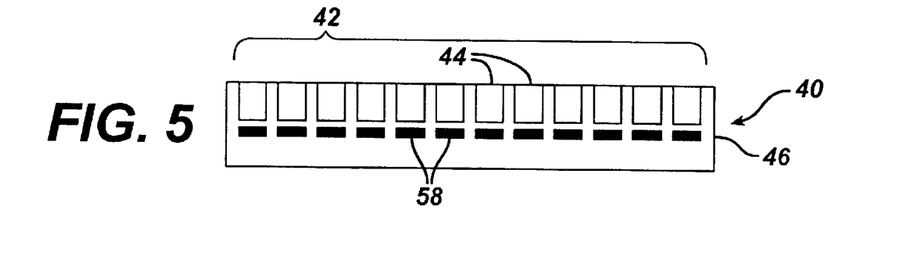
FIGS. 5 to 8 are schematic cut-away representations of various plates and ferromagnetic configurations.

In FIG. 5, reactor plate 40 includes an array 42 of reaction wells 44 embedded into a supporting substrate 46 of the plate 40. The plate 40 includes ferromagnetic discs 58 that are respectively associated with reaction wells 44. Wells 44 can directly contain reagent or vials or other containers can be inserted into wells 44 to provide replaceable reaction sites. The ferromagnetic discs 58 can have the same Curie temperature to provide a constant temperature across the array 42 or the Curie temperature of the discs can be chosen to provide a stepped temperature gradient. For example, the first row of 8-wells of a 96-well plate can be associated with ferromagnetic discs 58 with a Curie point of 100° C., a second row with discs 58 having a Curie point of 110° C. and so on until the last row of the well plate contains discs with a Curie point of 210° C. Adjacent rows or columns of wells can be associated with ferromagnetic discs of any desired Curie point according to the constraints or requirements of the CHTS methodology. The $T_c$ of discs 58 in adjacent rows or columns of an array may be widely different as long as thermal conductivity of the substrate 46 construction material prevents thermal cross-talk among wells 44.

Figure 6:
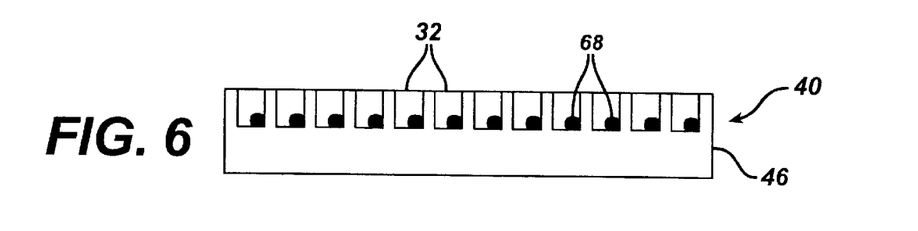

FIG. 6 shows a reactor plate 40 with discrete ferromagnetic objects 68 added directly into each well cavity 32. The objects can be beads, bars, discs, cylinders, flakes or particles or any shape conducive to good heat transfer to the reaction medium. The objects can have the same Cure temperature to provide a constant temperature across the array or the objects can be chosen with respect to Curie temperature to provide a stepped gradient with different reaction temperatures in one or more wells. For example, a 96-well plate can have a first row of 8-wells containing 100° C. Curie point objects. A second row can have 110° C. Curie point objects and so on, with the last row of the well plate containing 210° C. Curie point objects. Adjacent rows or columns can contain ferromagnetic objects with any accessible Curie point.

The ferromagnetic objects can comprise metals, alloys, ceramics and inorganics and can be present in the shapes described above. The objects can be encapsulated in vitreous substances, encapsulated in polymers stable at the $T_c$, encapsulated by a plating or coating or the objects can be used without encapsulation if the ferromagnetic material is unreactive with the reaction medium. Suitable encapsulants include polymers, fluoropolymers, glass and other vitreous materials, ceramics, foamed materials and so-called syntactic foams. The encapsulants are preferably vitreous materials and more preferably quartz to avoid chemical interactions with the ferromagnetic material. Metals can also be used for plating or encapsulating if they have Curie points below operating temperatures of the CHTS protocol and do not interfere with RF penetration to the ferromagnetic material.

Intervals of the Curie point differences can be whatever are suitable for the particular CHTS system as long as thermal conductivity of the array plate substrate 16 does not permit heat cross-talk among wells. The difference can-be less than about 50° C. between adjacent wells. Desirably, the difference is less than about 25° C. between adjacent wells and preferably the difference is less than 10° C. between adjacent wells.

When the ferromagnetic objects have the same $T_c$, the substrate 16 can comprise any material that will not interact with the RF field and that has high thermal conductivity. In the embodiment with variable temperatures across the array plate, the substrate 16 material should have low thermal conductivity to avoid cross-talk between adjacent wells. Examples of suitable substrate 16 materials include polymers, either thermoplastics or thermosets, fluoropolymers such as polytetrafluoroethylene and others, glass, quartz and other vitreous materials, ceramics, foamed ceramics and syntactic foams. The substrate 16 materials can be filled with low thermal conductivity additives such as hollow beads, bubbles and voids or particles of low conductivity material.

Figure 7:
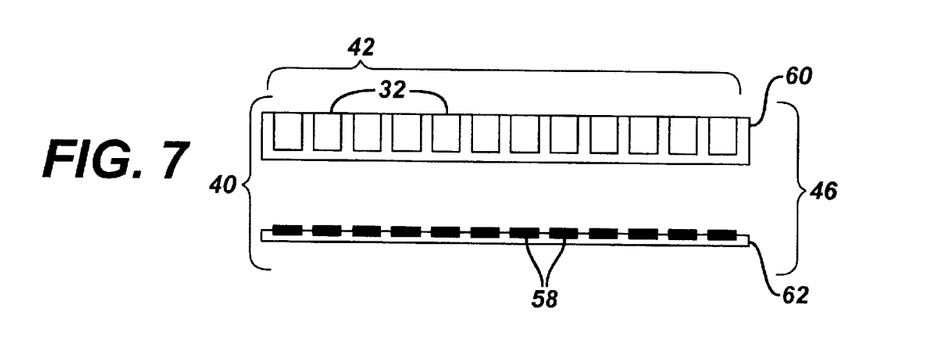
Figure 8:
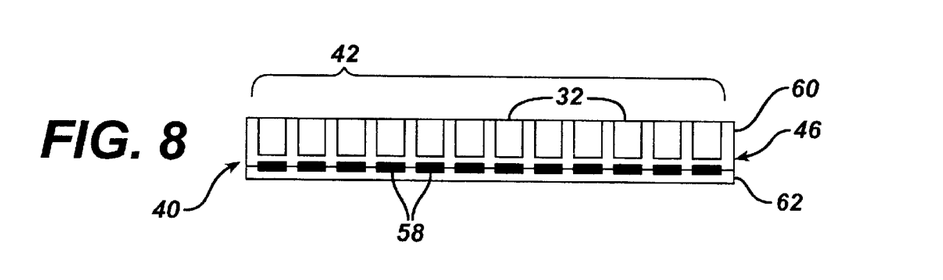

FIGS. 7 and 8 show further embodiments of the reactor plate 40. FIG. 7 shows a separable substrate 46 comprising top section 60 and bottom section 62. In this embodiment, the two sections 60 and 62 can be separated to receive removable ferromagnetic discs 58. FIG. 7 shows substrate 46 separated into two sections, 60 and 62 and FIG. 8 shows the same substrate 46 assembled.

Figure 9:
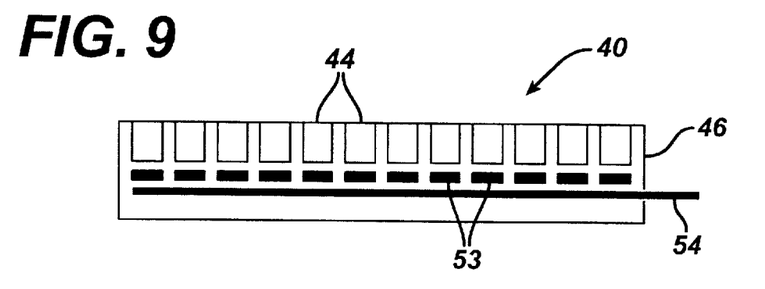
FIGS. 9 to 11 are schematic cut-away representations of various RF antenna configurations.
Figure 10:
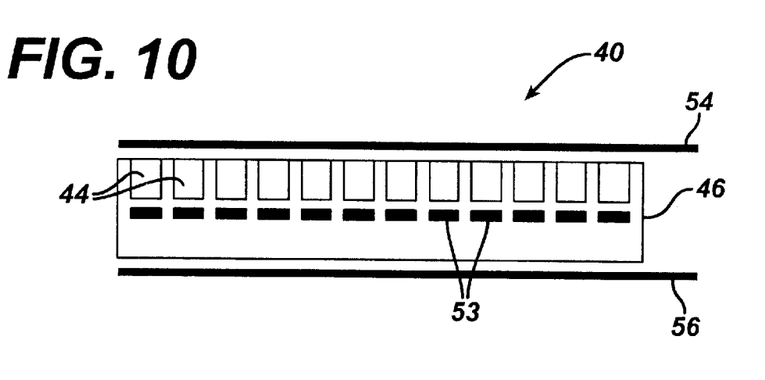
Figure 11:
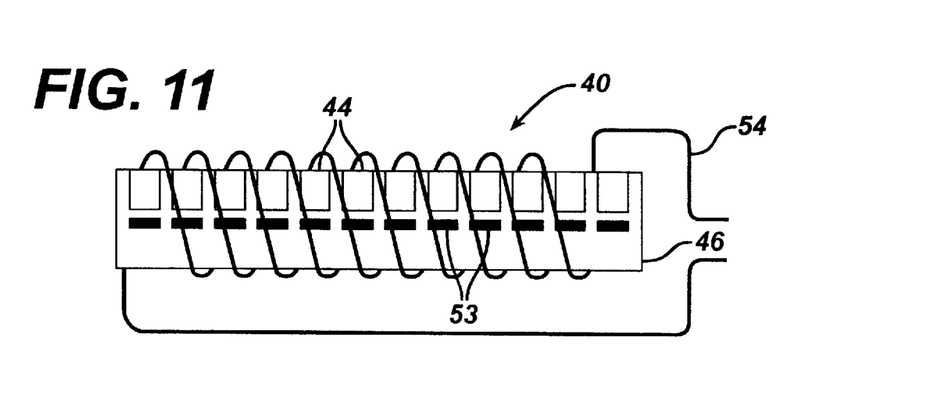
Figure 12:
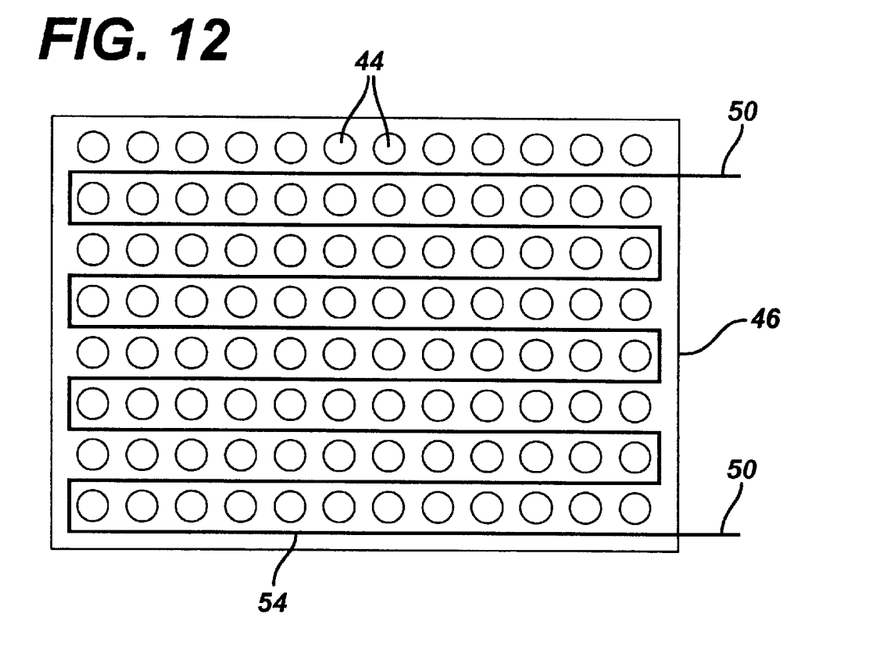
FIG. 12 is a schematic top view and FIG. 13 is a schematic side view of a reactor plate.
Figure 13:
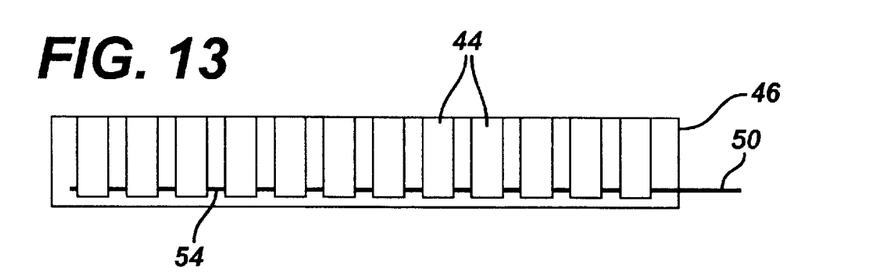

FIGS. 9 to 13 illustrate various RF antenna and coil arrangements according to the invention. FIG. 9 shows a reactor plate 40 with integral ferromagnetic discs 58 and an RF antenna coil 54 embedded in substrate 46. The coil 54 is located in close proximity to the ferromagnetic discs 58. FIG. 10 shows a well plate 40 with integral ferromagnetic discs 58 and opposing RF antenna coils 54 and 56 above and below the array 42 of reaction wells 44. FIG. 11 shows a reactor plate 40 with integral ferromagnetic discs 58 and surrounding RF antenna coil 54. FIG. 12 is a top view and FIG. 13 is a side view of a 96-well reactor plate 40 and a sinuous antenna 54 that winds along rows of the array 42 wells 44. The antenna is attached to an electric field generator (not shown) by means of leads 50.

In any of FIGS. 5–13, application of RF power heats the contents of wells 44 to the $T_c$ of the associated discs 58 and holds that temperature until the power is terminated. The contents of the wells 44 are then analyzed by serial or parallel analytical means. A video camera and a CCD imager to obtain images of the plate are examples of parallel analytical means. Image analysis can then determine color levels from the imaged signals of each well location. An image analysis program can then transfer the results to a computer for evaluation. In a serial analysis, a robotic device can address each well 44 in sequence with a fiber optic sampling probe connected to a spectrograph. In this case, individual spectra or derived color values can be transferred to a computer for evaluation.

These and other features will become apparent from the following detailed discussion, which by way of example without limitation describes preferred embodiments of the present invention.

EXAMPLE 1

A glass 96 well plate with flat bottom wells is placed on a substrate as in FIG. 5, containing ferromagnetic discs in rows of 8. Pairs of the rows have identical compositions so that 6 different ferromagnetic disc compositions are provided in all. Adjacent pairs of rows have discs of different composition such that there is a 15° C. increase in $T_c$ of the disc materials across the 6 pairs of rows of the 96 well plate. The discs are prepared from Fe/Ni alloys that vary in composition by about 0.5 atom % in the range of 36 to 38.5 atom % Ni. Thus, target temperatures across the reaction array range from 265° C. to 322° C.

A varying combinatorial array of bisphenol-A polycarbonate and a selection of experimental and commercial stabilizers at known concentrations are loaded into the array wells by means of a robotic fluid handling device and the transfer solvents are evaporated. Thus, an array consisting of 6 replicates of 16 elements of polycarbonate resins with varying stabilizer compositions and amounts are generated. The wells are capped with an oxygen permeable membrane and the reaction plate is attached to an RF generator. Application of RF power heats the reaction wells to the $T_c$ of the discs and holds that temperature until the power is discontinued. The contents of the reactor plate are then analyzed by a CCD imager to obtain an image of the entire plate. Image analysis then determines color levels from the red, green and blue signals of the image at each well location. An image analysis program then transfers the imaging data to a computer for analysis. Effectiveness of the various stabilizers as a function of temperature for each polycarbonate/stabilizer composition is determined by measuring the amount of thermal yellowing of the resin.

EXAMPLE 2

The following example illustrates the invention as carried out in the reactor plate 10 of FIG. 6. A 96-well plate 10 is provided that is constructed of quartz. A 25 milligram disc of an alloy containing 38.6 atom % nickel is placed in each well 14. Then, to each well a robotic fluid delivery system adds diphenyl carbonate and bisphenol-A reactants. Subsequently, a range of different basic catalysts are added by a fluid robotic delivery system so that individual wells or groups of wells have chemically distinct catalysts or identical catalysts with varying concentrations. The array plate 10 is placed inside an antenna coil and excited by a 200 watt RF field. The reaction temperature rises rapidly to 325° C. and holds steady while the RF field is maintained. At the end of a reaction time, the array plate 10 is cooled and the resulting polycarbonate resins are analyzed.

While a preferred embodiment of the invention has been described, the present invention is capable of variation and modification and therefore should not be limited to the precise details of the Example. For example, the procedure of Example 1 can be carried out in the array plate 10 or 40 of any of FIGS. 3 to 5 or 7 to 8 with any of the RF coil arrangements illustrated in FIGS. 9 to 13. The invention includes changes and alterations that fall within the purview of the following claims.

What is claimed is:

1. A reactor plate, comprising:
   a substrate with an array of individually ferromagnetically controllable reaction wells; and
   at least one discrete ferromagnetic object disposed in operative proximity to at least one of said individually ferromagnetically controllable reaction wells,
   wherein said ferromagnetic object comprises a composition having a predetermined Curie point that, in the presence of an electric field, heats an individually ferromagnetically controllable reaction well to a constant predetermined temperature.

2. The reactor plate of claim 1, comprising at least two discrete ferromagnetic objects having different Curie temperatures.

3. The reactor plate of claim 1, further comprising an RF antenna coil included with said substrate to provide an electric field to said ferromagnetic object.

4. The reactor plate of claim 1, further comprising an RF antenna coil surrounding said substrate to provide an electric field to said ferromagnetic object.

5. The reactor plate of claim 1, further comprising two RF antenna coils placed respectively above and below said substrate to provide an electric field to said ferromagnetic object.

6. The reactor plate of claim 1, further comprising an electric field generator attached to said substrate to provide an electric field to said ferromagnetic object.

7. The reactor plate of claim 1, further comprising an electric field RF generator and antenna coil included with said substrate to provide an electric field to said ferromagnetic object.

8. The reactor plate of claim 1, further comprising a microwave oven to provide RF energy to provide an electric field to said ferromagnetic object.

9. The reactor plate of claim 1, wherein said ferromagnetic object is in the form of a disc embedded within said substrate in proximity to at least one reaction well of said array.

10. The reactor plate of claim 1, wherein said ferromagnetic object is in the form of a disc embedded within said substrate in proximity to a bottom of at least one reaction well of said array.

11. The reactor plate of claim 1, wherein said ferromagnetic object comprises a plurality of discs embedded within said reaction plate, each disc of said plurality in proximity to a paired reaction well of said array.

12. The reactor plate of claim 1, wherein said ferromagnetic object comprises at least one shell of said material replaceably fitted into at least one reaction well of said array.

13. The reactor plate of claim 1, wherein said ferromagnetic object forms a well lining that is an integral part of said substrate.

14. The reactor plate of claim 1, comprising at least two different ferromagnetic objects.

15. The reactor plate of claim 1, comprising at least two different ferromagnetic objects in adjacent wells of said array, wherein respective Curie temperatures ($T_c$) between said objects is less than about 50° C.

16. The reactor plate of claim 1, comprising at least two different ferromagnetic objects in adjacent wells of said array, wherein respective Curie temperatures ($T_c$) between said objects is less than about 25° C.

17. The reactor plate of claim 1, comprising at least two different ferromagnetic objects in adjacent wells of said array, wherein respective Curie temperatures ($T_c$) between said objects materials is less than about 10° C. between adjacent wells.

18. A method of combinatorial high throughput screening (CHTS), comprising:
   providing a reactor plate comprising a substrate with an array of individually ferromagnetically controllable reaction wells and a at least one discrete ferromagnetic object responsive to the application of an electric field, wherein said ferromagnetic object comprises a composition having a predetermined Curie point that, in the presence of said electric field, heats an individually ferromagnetically controllable reaction well to a constant predetermined temperature;

energizing said electric field to control temperature in the proximity of at least one of said reaction wells; and conducting chemical synthesis within at least one of said reaction wells at a temperature determined by the Curie temperature of said ferromagnetic material, wherein said ferromagnetic object is disposed in operative proximity to at least one of said individually ferromagnetically controllable reaction wells.

19. The method of claim 18, wherein said electric field is generated by a generator included with said substrate.

20. The method of claim 18, wherein said electric field is generated by an RF generator and antenna coil included with said substrate.

21. The method of claim 18, wherein said electric field is generated by an RF antenna coil surrounding said substrate.

22. The method of claim 18, wherein said electric field is generated by an RE generator and antenna coil surrounding said substrate.

23. The method of claim 18, wherein said ferromagnetic object is in the form of a disc embedded within said substrate in proximity to at least one reaction well of said array.

24. The method of claim 18, wherein said ferromagnetic object comprises a plurality of discs embedded within said reaction plate, each disc of said plurality in proximity to a paired reaction well of said array.

25. The method of claim 24, wherein each of said discs of said plurality is comprised of a ferromagnetic material so as to impart a characteristic temperature to its paired reaction well when said electric field is energized.

26. The method of claim 24, wherein at least one of said discs of said plurality is comprised of a ferromagnetic material so as to impart a temperature to its paired reaction well different from the temperature imparted to at least one other reaction well.

27. The method of claim 18, wherein said ferromagnetic object comprises at least one shell of said material replaceably fitted into at least one reaction well of said array.

28. The method of claim 18, wherein said ferromagnetic object forms a well lining that is an integral part of said substrate.

29. The method of claim 18, further comprising depositing a reactant within said at least one well;

effecting a chemical reaction of said reactant by heating resulting from energizing said electric field to synthesize a reaction product; and evaluating said reaction product.

30. A CHTS method, comprising:

providing a reactor plate comprising an array of individually ferromagnetically controllable reaction wells;

depositing a ferromagnetic object within at least one of said wells, said ferromagnetic object being responsive to the application of an electric field, and said ferromagnetic object comprising a composition having a predetermined Curie point that, in the presence of said electric field, heats an individually ferromagnetically controllable reaction well to a constant predetermined temperature;

energizing an electric field to individually control temperature in said at least one well; and conducting chemical synthesis within at least one of said reaction wells at a temperature determined by the Curie temperature of said ferromagnetic object.

31. The method of claim 30, wherein the ferromagnetic object is deposited in a plurality of said reaction wells to control temperature in said reaction wells.

32. The method of claim 30, wherein said electric field is generated by a generator included with said substrate.

33. The method of claim 30, wherein said electric field is generated by an RF generator and antenna coil included with said substrate.

34. The method of claim 30, wherein said electric field is generated by a microwave oven.

35. The method of claim 30, wherein said electric field is generated by an antenna coil surrounding said substrate.

36. The method of claim 30, wherein said ferromagnetic object is in the form of one or more disks placed within one or more reaction wells of said array.

37. The method of claim 30, wherein said ferromagnetic object comprises a plurality of discs placed within one or more reaction wells of said array.

38. The method of claim 37, wherein each of said discs of said plurality comprises a ferromagnetic material that imparts a characteristic temperature to its paired reaction well when said electric field is energized.

39. The method of claim 30, wherein the ferromagnetic object is a bead.

40. The method of claim 30, wherein the ferromagnetic object is a rod or bar.

41. The method of claim 30, wherein the ferromagnetic object is a cylinder.

42. The method of claim 30, further comprising depositing a reactant within at least one reaction well;

effecting a chemical reaction of said reactant by heating resulting from energizing said electric field to synthesize a reaction product; and evaluating said reaction product.

\* \* \* \* \*

UNITED STATES PATENT AND TRADEMARK OFFICE
CERTIFICATE OF CORRECTION

PATENT NO. : 6,613,285 B1
DATED : September 2, 2003
INVENTOR(S) : James Claude Carnahan It is certified that error appears in the above-identified patent and that said Letters Patent is hereby corrected as shown below:

Column 5,
Line 1, after "is" delete "Operatively" and insert therefor -- operatively --

Column 6,
Line 8, after "can" delete "___"

Column 8,
Line 56, after "object" delete "materials"
Line 62, after "and" delete "a"

Column 9,
Line 18, after "an" delete "RE" and insert therefor -- RF --

Signed and Sealed this

Ninth Day of November, 2004

JON W. DUDAS
*Director of the United States Patent and Trademark Office*